May 2, 1967 J. E. BENNETT ET AL 3,317,022
LOADING MACHINE OPERATING MECHANISM
Filed Dec. 10, 1964 5 Sheets-Sheet 1
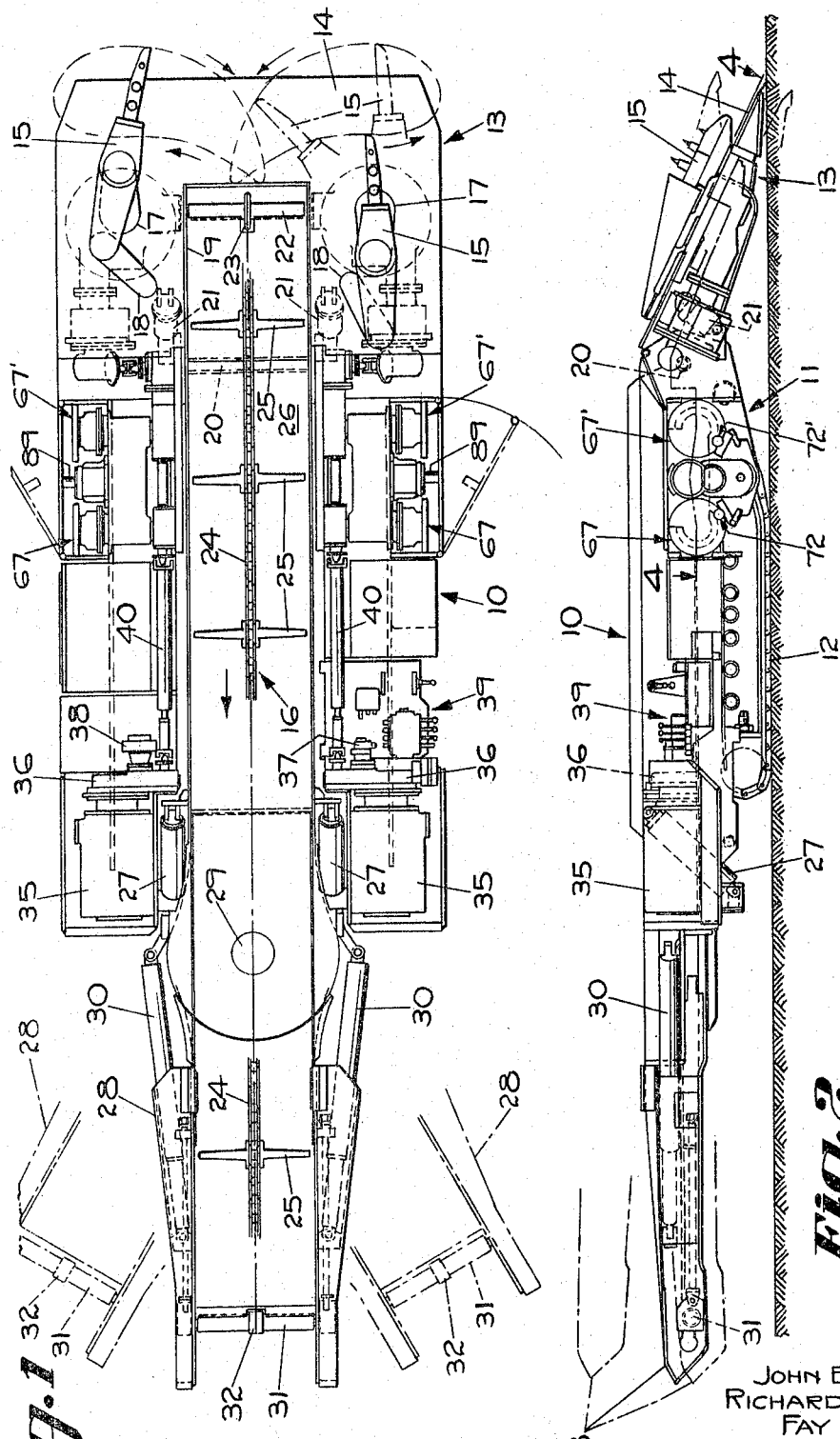
INVENTORS;
JOHN E. BENNETT,
RICHARD C. McMAHON &
FAY E. MUNGER,
BY David Young
ATTORNEY.

INVENTORS;
JOHN E. BENNETT,
RICHARD C. McMAHON &
FAY E. MUNGER,
By David Young
ATTORNEY.

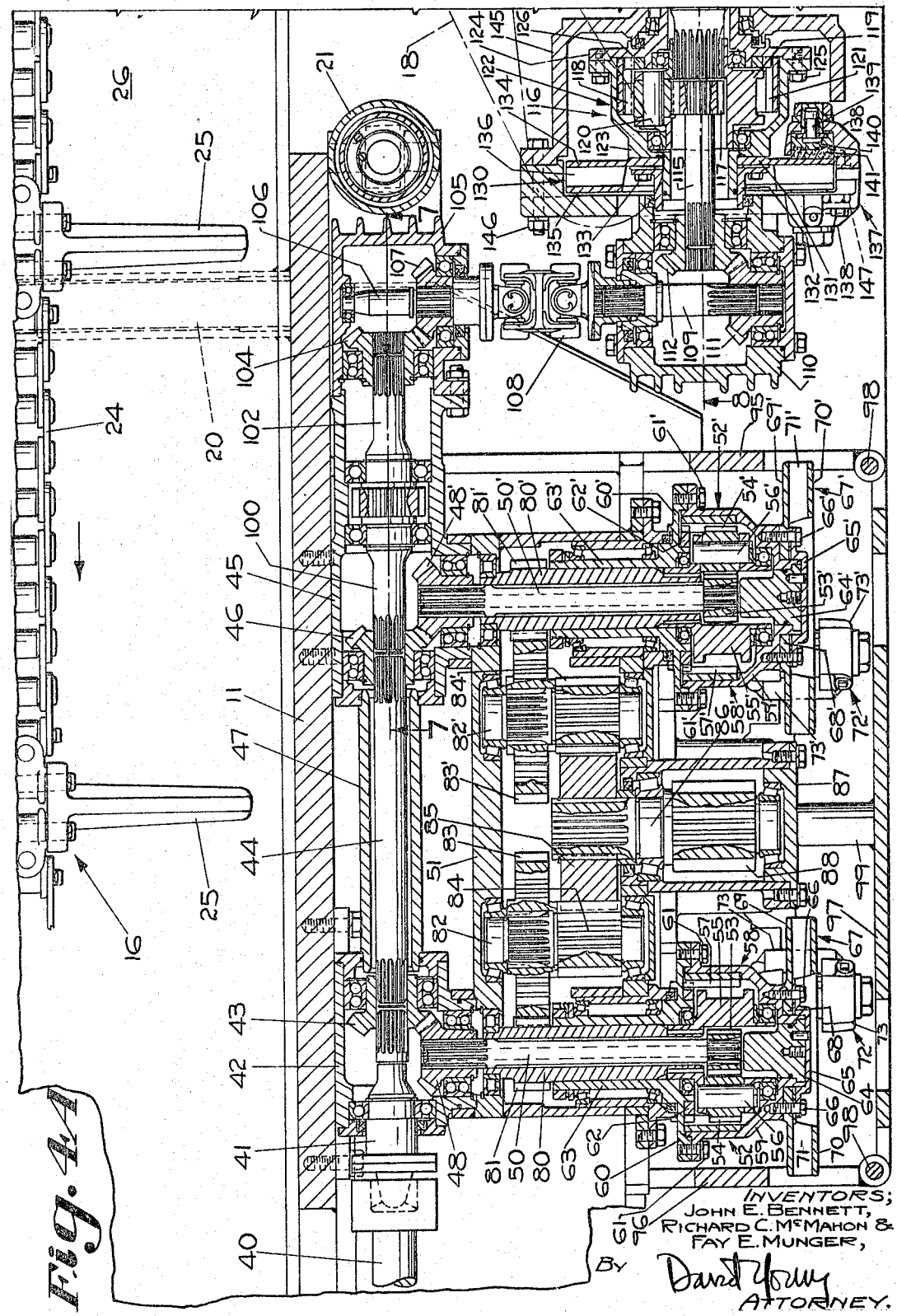

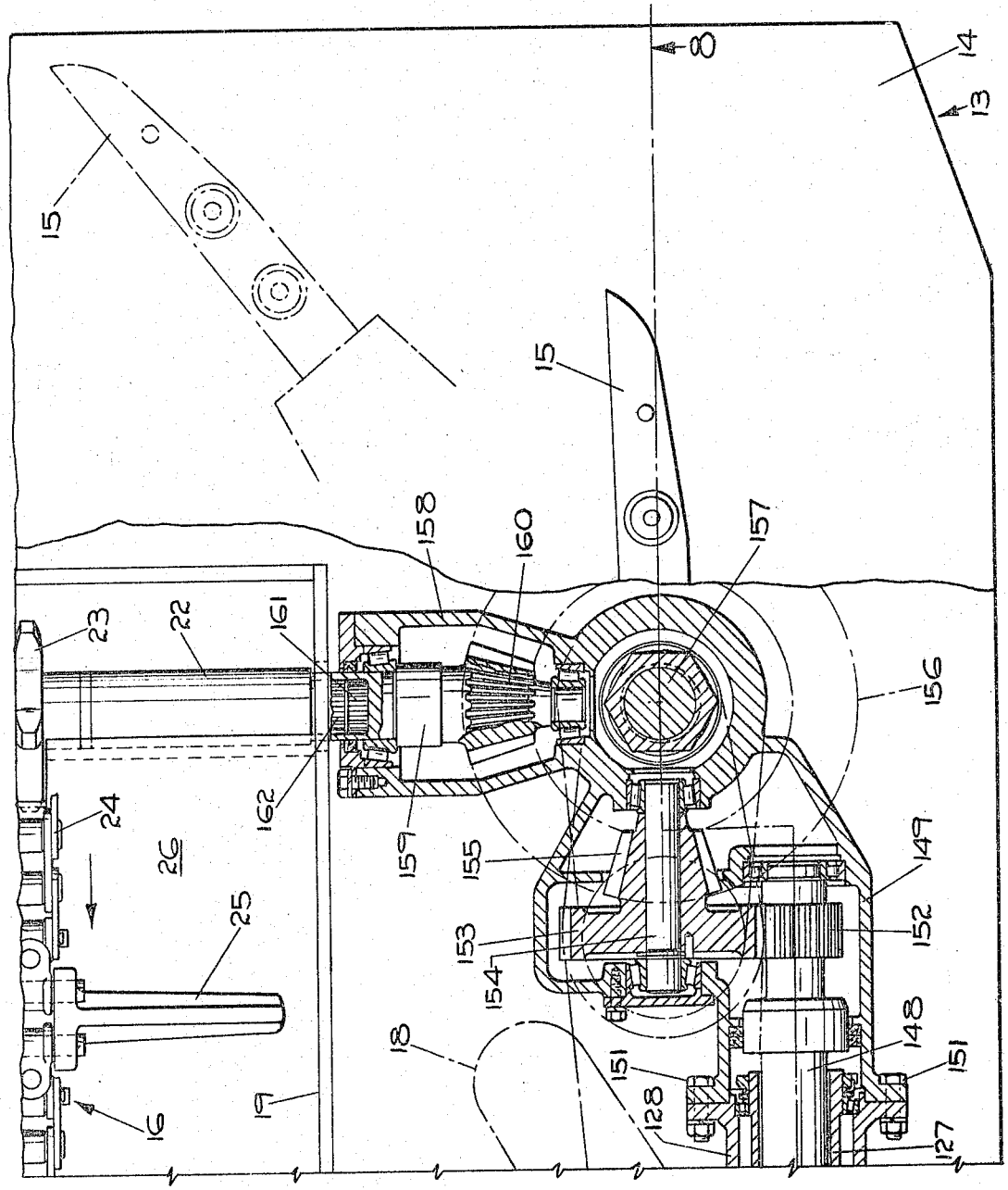

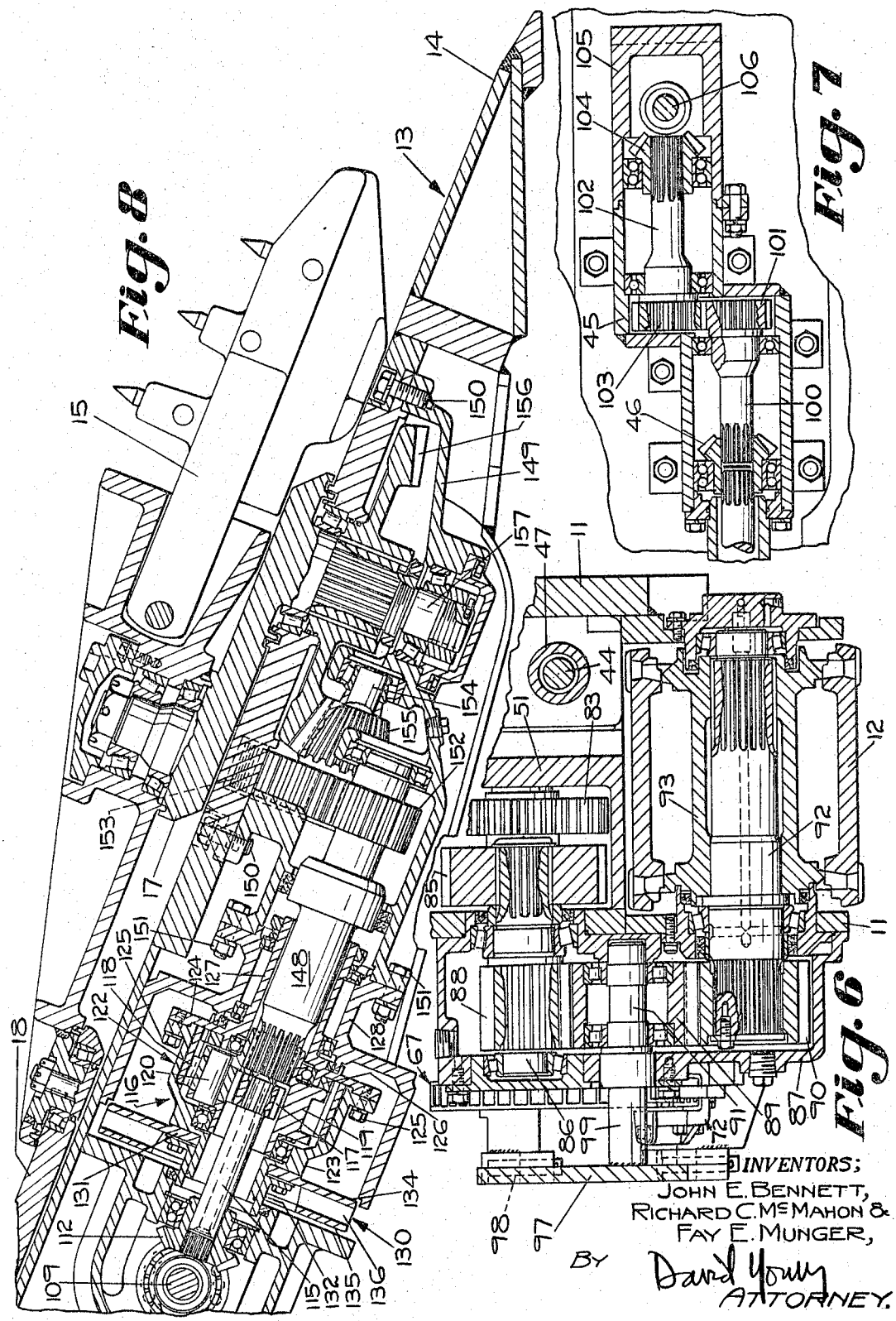

United States Patent Office 3,317,022
Patented May 2, 1967

3,317,022
LOADING MACHINE OPERATING MECHANISM
John E. Bennett, Richard C. McMahon, and Fay E. Munger, Columbus, Ohio, assignors to Jeffrey Galion Manufacturing Company, a corporation of Ohio
Filed Dec. 10, 1964, Ser. No. 417,396
20 Claims. (Cl. 198—10)

The instant invention relates to loading machines, and more particularly, to improved operating mechanisms for loading machines.

The loading machines to which the instant invention is applicable, are primarily used in mining operations. Such loading machines comprise gathering means at the forward end thereof, which collect the mined material, and deliver it into a conveyor which extends through the center of the machine along the longitudinal center line thereof. The conveyor moves the material from the forward end of the machine to the rear end of the machine, from which the material is discharged into a suitable conveyance, such as a conveyor or shuttle car that removes the mined material. The loading machine is a mobile apparatus and is customarily provided with endless crawler traction treads, or other supporting means by which the machine may be propelled.

It is an object of the invention to provide a loading machine with improved operating mechanisms for the traction means and gathering means of the machine.

It is another object to provide an improved loading machine of simplified construction, for improved operation and maintenance of the machine.

It is a further object to provide an improved loading machine, in which the power is supplied by a reduced number of motors, which may be two in number.

It is also an object to provide an improved loading machine, in which the motors for driving the machine are started under no load.

It is still another object to provide an improved loading machine, in which the motors for operating the machine are continuously running.

A further object is to provide an improved loading machine in which the operating demands on the motors are materially reduced, thereby effecting a simplification of the starting and controlling equipment for the motors.

It is still a further object to provide an improved loading machine which has a pair of motors for driving the loading machine, and in which the machine may be driven by one of the motors, in the event of failure of the other motor.

Still another object is to provide an improved loading machine of simplified construction, in which many like parts are utilized to permit interchangeability of parts, and thereby to facilitate maintenance of the machine.

Still a further object is to provide an improved loading machine, in which the operating mechanisms are placed in exposed positions on the machine frame to facilitate service of the mechanisms.

Yet another object is to provide operating mechanisms for a loading machine, which include gears of a simple and efficient form to improve the operation and maintenance of the loading machine.

Yet a further object is to provide a loading machine, including improved operating mechanisms for such loading machine, in which certain parts of the mechanisms which are subject to being heated are exposed to the atmosphere for increased rate of liberation of such heat, to minimize the transmission of heat to other parts of the loading machine.

It is also an object to provide a loading machine having improved operating mechanisms for increased speed of operation and capacity of the loading machine.

It is still a further object to provide improved and simplified drive mechanism for efficient operation of machine devices.

Other objects of the invention will appear hereinafter, the novel features and combinations being set forth in the appended claims.

Referring to the drawings:

FIG. 1 is a plan view of a loading machine, which incorporates the instant invention;

FIG. 2 is a side elevational view of the loading machine;

Figure 3:
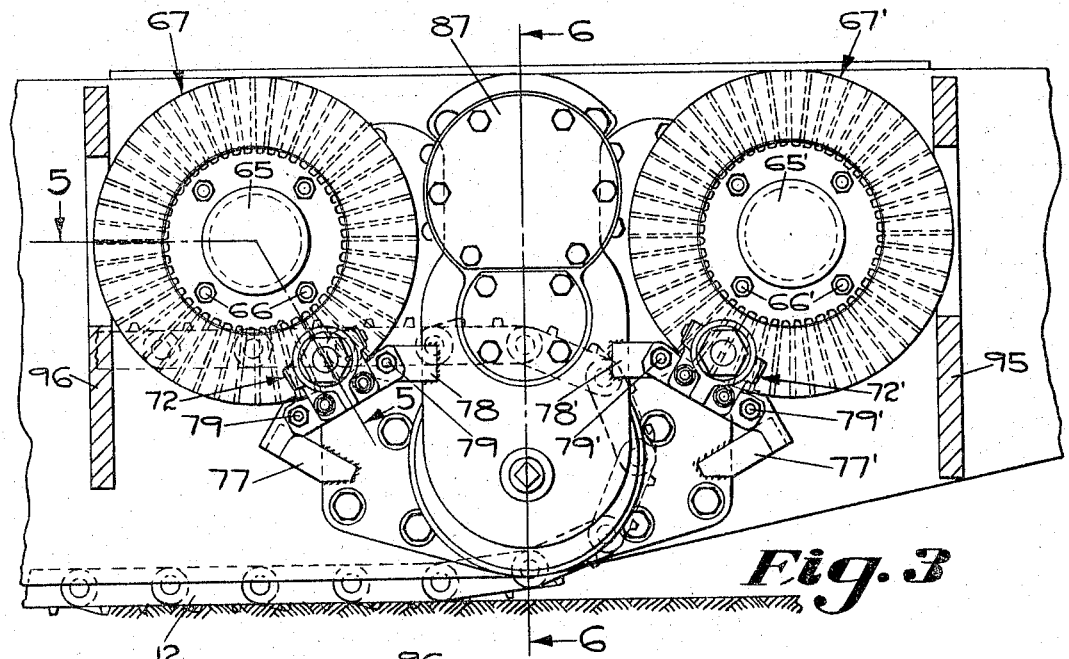
FIG. 3 is an enlarged, side elevational view of a portion of the loading machine, in the area of the drive means for the traction treads.
Figure 5:
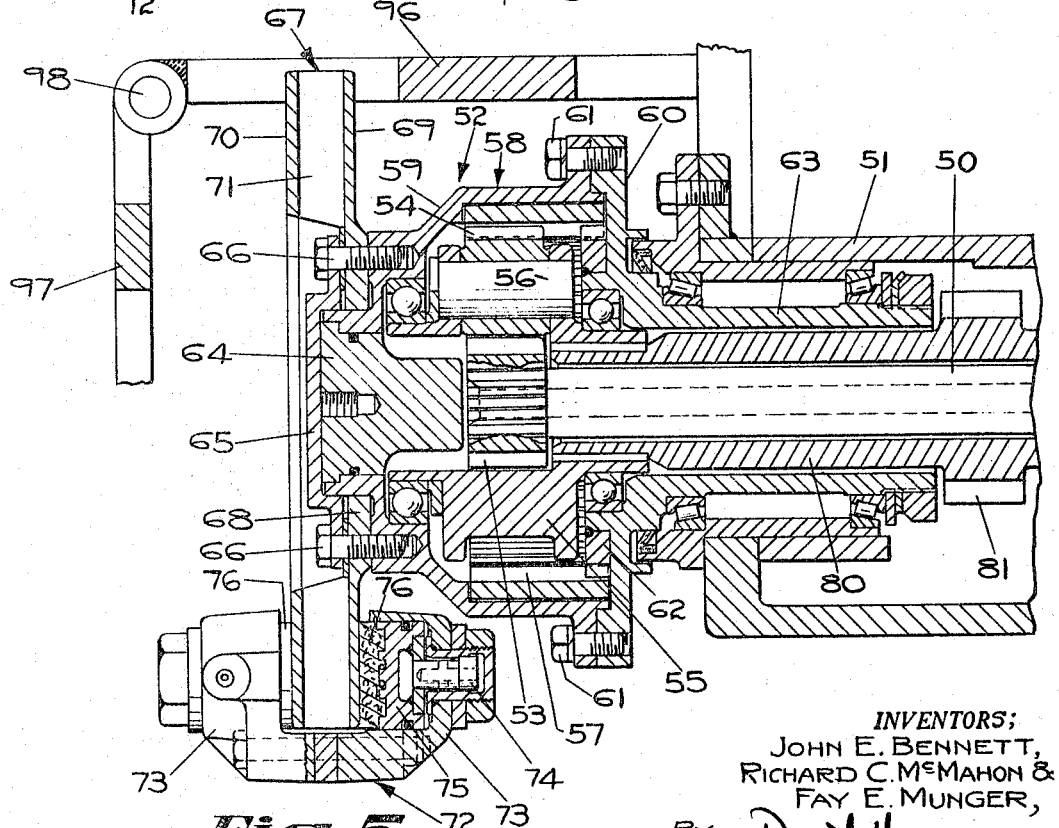

FIGS. 4A and 4B together are a sectional view of the operating mechanisms for the traction treads and the gathering arms, taken on the line 4—4 in FIG. 2;

FIG. 5 is a sectional view of the reverse traction transmission, taken on the line 5—5 in FIG. 3;

FIG. 6 is a sectional view of the final drive for a traction tread, taken on the line 6—6 in FIG. 3;

FIG. 7 is a sectional view of the gear drive, taken on the line 7—7 of FIG. 4A; and FIG. 8 is a vertical sectional view of the gathering means drive, taken on the line 8—8 in FIGS. 4A and 4B.

Referring to the drawings, particularly FIGS. 1 and 2, there is illustrated therein a loading machine which incorporates the instant invention. Such loading machine 10 includes a main frame 11, which supports the various drive mechanisms and operating devices of the machine. The main frame 11 has an endless crawler traction tread 12 at each side thereof, which supports the loading machine 10 on the ground surface, and by which the machine is propelled in either a forward direction or a reverse direction. The loading machine 10 may be steered by operating only one of the traction treads 12.

At the front end of the loading machine 10, there is a head frame 13, the top of which is formed as a flat apron or deck 14 that extends forwardly and downwardly from the main frame 11 to the ground surface. There is a gathering arm 15 at each side of the apron 14 for collecting material and sweeping the material onto the apron 14 and into a conveyor 16, the forward end of which is disposed in a well 19 in the head frame 13. Each gathering arm 15 is operated by a rotating crank 17, with a constraining link 18. The crank 17 causes the gathering arm 15 to advance forwardly of the apron 14 into the material on the ground. The link 18 constrains the movement of the gathering arm 15, so that it sweeps the material up onto the apron or desk 14 and into the well 19, in which the forward end of the conveyor 16 is disposed.

The head frame 13 is connected to the main frame 11 on a laterally extending pivot 20 for elevational adjustment, so that the leading edge of the apron 14 is disposed on the ground surface, in proper position for the gathering arms 15 to collect the mined material. Hydraulic cylinders 21, 21, one at each side of the main frame 11, are connected between the main frame 11 and the head frame 13. By extension and contraction of the hydraulic cylinders 21, 21, the head frame 13 is raised and lowered, respectively, to adjust the elevational position of the head frame 13.

The conveyor 16 is centrally disposed in the main frame 11 along the longitudinal center line of the loading machine 10. A foot shaft 22 is rotatably supported on the head frame 13 in the well 19, and has a sprocket wheel 23. The conveyor 16 has an endless chain 24, which extends around the foot shaft 22 in engagement with the sprocket wheel 23. A plurality of transverse flights 25 are secured to the endless chain 24 at equally spaced positions along its length. The flights 25 extend in opposite directions from the endless chain 24, and together with the chain 24 operate over the conveyor bed 26 to move material from the well 19 to the rear end of the loading machine 10.

The portion of the conveyor 16 that extends rearwardly of the transverse pivot 20, may be raised and lowered with respect to the main frame 11 by hydraulic cylinders 27, 27, disposed one at each side of the conveyor 16, and connected between the main frame 11 and the conveyor 16. Thus, the position of the discharge end of the conveyor 16 may be vertically adjusted in accordance with the height of the conveyance into which the material is discharged.

The rear end of the conveyor 16 has a tail portion 28 which may be swung laterally about a pivot 29. At each side of the conveyor tail portion 28 there is a hydraulic cylinder 30, which are operative by contraction of one and extension of the other, whereby the conveyor tail portion 28 may be swung to one side or the other, as desired, to locate the discharge from the conveyor 16 over the conveyance that is positioned behind the loading machine 10. At the end of the conveyor tail portion 28 there is an idler shaft 31, with an integral wheel 32, to guide the chain 24 and the flights 25 into the return run.

The loading machine 10 has a pair of motors 35, 35, disposed one at each side of the loading machine 10 and suitably supported on the main frame 11. The motors 35, 35 supply the power for operating the various drive mechanisms and operating devices of the loading machine 10, and customarily are electric motors. Each motor 35 has a gear case 36, secured to the motor 35, and enclosing a gear train, to which the motor 35 delivers its drive. Hydraulic pumps 37, 38 are secured to the gear cases 36, 36, and are connected to the gear trains within the gear cases 36, 36 for operation. The hydraulic pumps 37, 38 supply hydraulic fluid under pressure for operating the various hydraulic devices of the loading machine 10. At one side of the loading machine 10 there is provided an operator's station 39, which includes suitable electric and hydraulic controls for operation of the loading machine 10.

The motors 35, 35 are connected by suitable drive connections to the operating mechanisms to transmit power for driving the crawler treads 12, for driving the gathering arms 15, and for driving the conveyor 16. The operating and driving mechanisms for the crawler treads 12, the gathering arms 15 and conveyor 16 are symmetrical about the longitudinal center line of the loading machine 10, and therefore, the description will proceed hereafter with reference to one side only of the loading machine 10, this being the right side of the machine, looking in the forward direction, it being understood that the description applies equally to the left side of the loading machine 10, which includes identical mechanisms.

A suitable drive shaft 40 extends forwardly from the gear case 36 to transmit the drive. The drive shaft 40 is universally connected to a shaft 41, which is rotatably supported in a rear miter gear case 42 secured to the main frame 11. The shaft 41 has a splined connection to a miter gear 43, which has an extended hub by which the miter gear 43 is rotatably supported in the rear miter gear case 42. A longitudinally disposed connecting shaft 44 has a splined connection to the miter gear 43 and extends forwardly from the rear miter gear case 42. The connecting shaft 44 extends into a front miter gear case 45, that is secured to the main frame 11. The connecting shaft 44 has a splined connection to a miter gear 46, that is rotatably supported in the miter gear case 45 by its extended hub. A shaft housing 47 extends between the rear and front miter gear cases 42, 45, and is secured to the latter to enclose the connecting shaft 44.

A miter gear 48 is enclosed in the rear miter gear case 42 and has an extended hub, by which the miter gear 48 is rotatably supported. The miter gear 48 is on a lateral axis and is engaged with the miter gear 43, to be driven by the latter. A transmission input drive shaft 50 has a splined connection to the miter gear 48 and extends laterally outwardly from the miter gear 48. The shaft 50 extends through a gear housing 51, which encloses drive gears for the traction tread 12. The shaft 50 extends beyond the gear housing 51 to a planetary transmission 52 that is disposed exteriorly of the gear housing 51. The transmission 52 is the reverse drive transmission of the operating mechanism for the traction tread 12.

The sun gear 53 of the reverse drive planetary transmission 52 is integrally formed on the outer end of the drive shaft 50. A plurality of planet gears 54, which may be three in number, are disposed at equally spaced positions around the sun gear 53, and in engagement with the sun gear 53. Each planet gear 54 is rotatably supported in a planet gear carrier 55 by a shaft 56. A ring gear 57 is disposed concentrically with the sun gear 53, in engagement with the planet gears 54.

The planetary transmission 52 is enclosed within a rotatable transmission housing 58 that has a dome 59 and a base 60. The dome 59 encloses the several gears of the planetary transmission 52, and the base 60 is mated with the dome 59 to close the bottom of the dome 59. A plurality of bolts 61 secure the dome 59 and the base 60 to each other. The ring gear 57 is loosely placed within the dome 59 in engagement with the planet gears 54. A toothed ring 62 is secured to the base 60, as by welding, and is loosely engaged with the teeth of the ring gear 57. Thus, the toothed ring 62 fixes the position of the ring gear 57 within the transmission housing 58, so that the ring gear 57 and the transmission housing 58 are rotatable as a unit. However, there is such freedom of movement of the ring gear 57 in the housing 58 that there is an equalized engagement of the ring gear 57 with the planet gears 54. The sun gear 53 on the end of the input shaft 50 also has a freedom of movement for equalized engagement with the planet gears 54.

The transmission housing 58 is rotatably supported on the gear housing 51. The transmission housing 58 is disposed exteriorly of the gear housing 51, and the housing base 60 has an axially extending hub 63, which extends into the gear housing 51, to rotatably support the transmission housing 58 on the gear housing 51.

The top of the transmission housing dome 59 is open to receive a gear retainer 64, which extends to adjacent the sun gear 53. The top of the dome 59 is closed by a cover 65, secured by a plurality of bolts 66. A brake disc 67 is also secured to the top of the dome 59. The brake disc 67 has an internal flange 68, which is disposed between the top of the dome 59 and the cover 65, to be secured by bolts 66.

The brake disc 67 is rotatable with the transmission housing 58 and is used to lock the transmission housing 58 and the ring gear 57 in fixed position. The brake disc 67 has opposite, spaced brake faces 69, 70, which are separated by a plurality of radial ribs 71 to form the brake disc 67 with a fluted construction for greater dissipation of heat. A dual brake device 72, having a U-shape, extends to the opposite sides of the brake disc 67. Each side of the dual brake device 72 has a cylinder 73 with a piston 74 that is attached to a shoe 75. A brake pad 76 of suitable friction material is secured to the shoe 75. The pistons 74, 74 of the dual brake device 72 are movable toward the brake faces 69, 70, by hydraulic fluid pressure, to press the brake pads 76, 76 against the brake faces 69, 70. Upon engagement of the brake pads 76, 76 with the brake disc 67, by the application of force, the brake disc 67 is locked in position. Upon the release of the hydraulic pressure on the pistons 74, 74, the brake pads 76, 76 are released, and the brake disc 67 is again free to rotate. Each dual brake device 72 is fixedly secured in place on brackets 77, 78 by bolts 79.

The planet gear carrier 55 is rotatably supported in the transmission housing 58 on the dome 59 and the base 60. The planet gear carrier 55 has a splined connection with a reverse traction drive shaft 80 which extends in a lateral direction from the reverse transmission 52 into the traction gear housing 51. The inner end of the shaft 80 is rotatably supported on the traction gear housing 51, while the outer end of the shaft 80 is rotatably supported with the planet carrier 55. The shaft 80 extends through the axially extended hub 63 of the base 60. The shaft 80 is hollow, and the transmission input drive shaft 50 is concentrically disposed within the shaft 80, with the sun gear 53 being located beyond the end of the shaft 80.

The traction gear housing 51 encloses the intermediate traction drive spur gears, there being two gear trains, one for forward drive of the traction tread 12, and the other for reverse drive of the traction thread 12. The reverse traction drive shaft 80 has an integral spur gear 81, which is the first of the intermediate traction drive gears. A shaft 82 is rotatably supported in the housing 51. A spur gear 83 has a splined connection to the shaft 82, and is engaged with the gear 81, to be driven by the latter. A spur gear 84 is integrally formed on the shaft 82 and is engaged with a spur gear 85 to drive the latter. The gear 85 is secured to a shaft 86 with a splined connection. The shaft 86 is rotatably supported on the traction gear housing 51 and on a housing extension 87 of the traction gear housing 51.

The gear 85 is the first of the final drive gears to the traction tread 12. A spur gear 88 is integrally formed on the shaft 86, and is disposed in the housing extension 87. The gear 88 engages with a reach spur gear 89, which in turn engages a spur gear 90. The reach gear 89 is rotatably mounted on a fixed shaft 91 in the housing extension 87. The gear 90 is secured to the end of a shaft 92 with a splined connection. The shaft 92 extends laterally inwardly from the housing extension 87 and is rotatably supported on the main frame 11. A dual sprocket wheel 93 is fixedly secured to the shaft 92 with a splined connection, and the teeth of the dual sprocket wheel 93 engage the traction tread 12 to drive the latter.

The traction operating mechanism, as thus far described, is operative to drive the traction tread 12 in the reverse direction. A like operating mechanism is provided for driving the traction tread 12 in the forward direction. The forward drive operating mechanism is identical to the reverse drive operating mechanism, and therefore, need only be briefly described. In describing the forward drive operating mechanism, the same reference numerals are used as for the reverse drive operating mechanism, with a prime added, so that it will be apparent wherein like parts are utilized.

The miter gear 46 engages the miter gear 48' which is rotatably supported in the front miter gear case 45. A forward drive transmission input shaft 50' has a splined connection to the miter gear 48' and is driven by the latter. The shaft 50' extends through and beyond the gear housing 51 to a planetary transmission 52'. The outer end of the shaft 50' is formed with an integral gear that is the sun gear 53' of the planetary transmission 52'. A plurality of planet gears 54', which may be three in number, are disposed at equally spaced positions around the sun gear 53' and in engagement with the latter. A planet gear carrier 55' rotatably supports the planet gears 54', there being a shaft 56' for each planet gear 54'. A ring gear 57' is concentric with the sun gear 53' and engages the planet gears 54'.

The several gears of the planetary transmission 52' are enclosed within a transmission housing 58' that has a dome 59' and a base 60', which are mated and secured to each other by a plurality of bolts 61'. A toothed ring 62' is fixedly secured to the base 60' and is loosely engaged with the ring gear 57', to loosely secure the latter in the dome 59'. The planet gear carrier 55' is rotatably supported on the dome 59' and the base 60'. The base 60' has an axially extended hub 63', which extends into the traction gear housing 51, to rotatably support the transmission housing 58'.

The top of the transmission housing dome 59' receives a gear retainer 64'. A cover 65' closes the top of the dome 59' and is secured by a plurality of bolts 66'. A brake disc 67' is secured to the transmission housing 58', to rotate with the latter. The brake disc 67' has an internal flange 68', that is placed between the top of the dome 59' and the cover 65', to be secured by the bolts 66'. The brake disc 67' has opposite brake faces 69', 70', which are spaced from each other by a plurality of radial ribs 71', forming a fluted construction of the brake disc 67' for increased dissipation of heat.

A dual brake device 72' having a U-configuration extends to opposite sides of the brake disc 67'. The dual brake device 72' has oppositely disposed cylinders 73', 73', and is like the dual brake device 72 in all respects. By the application of hydraulic fluid under pressure to the dual brake device 72' the brake disc 67' is locked, to thereby lock the transmission housing 58' and the ring gear 57'. The dual brake device 72' is fixedly secured in position on brackets 77', 78' by bolts 79'.

A forward traction drive shaft 80' is secured to the planet gear carrier 55' by a splined connection, and extends inwardly from the forward transmission 52' into the gear housing 51. The shaft 80' extends through the extended hub 63' of the transmission housing base 60', and its inner end is rotatably supported on the gear housing 51. The outer end of the shaft 80' is rotatably supported with the planet gear carrier 55'. The shaft 80' is hollow, and the input drive shaft 50' extends through the shaft 80'.

A spur gear 81' is integral with the forward traction drive shaft 80', and engages the spur gear 83' to drive the latter. A shaft 82' is rotatably supported in the traction gear housing 51, and the gear 83' is fixedly secured to the shaft 82' by a splined connection. A gear 84' is integral with the shaft 82' and engages the gear 85, which is the first of the final drive gears for the traction tread 12. The gear 84' is rotated in the opposite direction from the gear 84, and accordingly, when the drive to the traction tread 12 is delivered from the gear 84', the traction tread 12 will be driven in the forward direction for forward propulsion of the loading machine 10.

A protective frame is provided around the reverse and forward transmissions 52, 52', and such frame comprises walls 95, 96 which extend laterally outwardly from the main frame 11. A side cover plate 97 is secured to the walls 95, 96 by pin connections 98, 98 to permit the side cover plate 97 to be swung outwardly to provide access to the transmission 52, 52' and to other elements of the operating mechanisms as may be needed for maintenance and other service operations. A post 99 extends laterally inwardly from the side cover plate 97 and abuts the housing extension 87 to prevent cave-in of the cover plate 97.

In the front miter gear case 45, there is a drive shaft 100 which is secured to the miter gear 46 with a splined connection. The shaft 100 is rotatably supported in the gear case 45, and its forward end has an integral gear 101. The gear case 45 is stepped upwardly, as seen in FIG. 7. A drive shaft 102 is rotatably supported in the gear case 45 above and ahead of the drive shaft 100. The drive shafts 100 and 102 are identical, but are oppositely disposed. A gear 103 is integral on the rear end of the drive shaft 102 and is engaged with the gear 101, to be driven by the latter. The forward end of the drive shaft 102 is secured to a miter gear 104 by a splined connection. The miter gear 104 is rotatably supported on its axially extended hub in an end miter gear case 105 that is secured to the forward end of the front miter gear case 45. A shaft 106 is rotatably supported in the miter gear case 105. A miter gear 107 is secured to the shaft 106 with a splined connection. The miter gear 107 is rotatably supported in the gear case 105 on its extended hub and engages the miter gear 104 to be driven by the latter.

A universal drive connection 108 connects the shaft 106 to a shaft 109 which is rotatably supported in a gathering head miter gear case 110. A miter gear 111 is secured to the end of the shaft 109 with a splined connection and is rotatably supported on its axially extended hub in the miter gear case 110. A miter gear 112 is rotatably supported on its axially extended hub in the miter gear case 110 and engages the miter gear 111 to be driven by the latter.

A gathering head transmission input drive shaft 115 is secured to the miter gear 112 with a splined connection and extends forwardly from the miter gear case 110 to the gathering means drive planetary transmission 116. A gear 117 is integral with the forward end of the shaft 115 and is the sun gear of the planetary transmission 116. A plurality of planet gears 118, which may be three in number, are disposed around the sun gear 117 at equally spaced positions in engagement with the sun gear 117. The planet gears 118 are supported by a planet gear carrier 119, with a shaft 120 for each planet gear 118 to rotatably mount it on the carrier 119. A ring gear 121 is concentric with the sun gear 117, and engages the several planet gears 118.

The planetary transmission 116 is enclosed within a transmission housing 122 having a dome 123 and a base 124 that are mated and secured to each other by a plurality of bolts 125. A toothed ring 126 is fixedly secured to the base 124, as by welding, and has its teeth loosely engaged with the ring gear 121 to loosely secure the latter in the transmission housing 122, so that the ring gear 121 and the housing 122 rotate together. The base 124 has an axially extending hub 127, by which the transmission housing 122 is rotatably supported in a fixed support 128. The brake disc 130 is formed with an internal flange 131 which is seated on the top of the dome 123. A flanged collar 132 is seated on the dome 123 and the brake disc 130, and the assembly is secured by a plurality of bolts 133.

The brake disc 130 is identical to the brake discs 67, 67', and comprises opposite brake faces 134, 135, which are separated by radial ribs 136, to provide a fluted construction for increased dissipation of heat. A dual brake device 137, having a U-form, is disposed adjacent the brake disc 130 and extends to the opposite brake faces 134, 135. The cylinders 138, 138 of the dual brake device 137 each comprises a piston 139 secured to a brake shoe 140, which has a friction brake pad 141 for engaging the brake faces 134, 135, to lock the brake disc 130, the transmission housing 122 and the ring gear 121.

The transmission support 128 has a rear opening bell 145, which is disposed around the transmission 116. The bell 145 forms a protective guard for the transmission 116. However, the bell 145 is open to the atmosphere so that the transmission 116 and the brake disc 130 are exposed to the atmosphere for increased dissipation of the heat from these elements. The miter gear case 110 is secured to the bell 145 by bolts 146. The dual brake device 137 is also secured to the bell 145 by bolts 147.

The planet gear carrier 119 is rotatably supported in the transmission housing 122, and has a splined connection to a gathering means drive shaft 148 that is driven by the planet gear carrier 119. The drive shaft 148 extends forwardly from the gathering means transmission 116 through the extended hub 127 of the planet gear carrier 119, and into a housing 149 for the gathering means drive gears. The housing 149 is secured to the gathering head frame 13 by a plurality of bolts 150. The support 128 is secured to the housing 149 by a plurality of bolts 151.

The rear end of the gathering means drive shaft 148 is rotatably supported with the planet gear carrier 119, and the forward end of the shaft 148 is rotatably supported in the housing 149. A spur gear 152 is integrally formed on the forward end of the shaft 148 and engages a spur gear 153. The gear 153 is fixedly secured to a shaft 154 that is rotatably supported in the gear housing 149. A bevel gear 155 is integral with the gear 153 and engages a bevel gear 156, that is secured to a shaft 157 with a splined connection. The shaft 157 is rotatably supported in the gathering means drive gear housing 149. The shaft 157 is integral with the crank 17 and depends from the latter, extending into the gear housing 149, to be rotated by the bevel gears 155, 156.

The gathering means drive gears housing 149 has a lateral extension 158 that extends inwardly towards the center line of the machine. A shaft 158 is rotatably supported in the housing extension 158. A bevel gear 160 is integral with the shaft 159 and engages the bevel gear 156, to be driven by the latter. The inner end of the shaft 159 has a splined socket 161 to receive a splined end 162 of the foot shaft 22 of the conveyor 16. Thus, there is a driving connection to the foot shaft 22 through the drive shaft 159, to drive the conveyor 16 when the gathering arms 15, 15 are driven.

In the operation of the loading machine 10, the motors 35, 35 are always started under a no load condition. The several transmissions 52, 52', 116 by which the traction treads 12, 12, the gathering arms 15, 15 and the conveyor 16 are driven, remain disengaged until hydraulic fluid under pressure is supplied to the respective dual brake devices 72, 72', 137. Such hydraulic fluid under pressure is not available until the motors 35, 35 are started, to operate the hydraulic pumps 37, 38. In the operation of the loading machine 10, the motors 35, 35 are continuously operated, since the operation of the traction treads 12, 12, the gathering arms 15, 15 and the conveyor 16 is started and stopped by engagement and disengagement of the respective transmissions 52, 52', 116. This is of great advantage, since the wear and tear on the motors 35, 35 are materially reduced by this construction in which the motors may be started under no load, and thereafter, are continuously operating when the loading machine 10 is put into operation. Also, the requirements for motor starting and controlling equipment are materially reduced by the reduced demands on the motors.

In the operating mechanisms of the invention, there are many duplicate parts, thereby materially reducing the total number of different parts that are required to construct the operating mechanisms of the loading machine 10. This has the further advantage of reducing the requirements of spare parts for maintenance of the equipment. The operating mechanisms for the traction treads 12, 12 are interchangeable from one side of the machine to the other side of the machine; there is symmetry on opposite sides of the longitudinal center-line of the machine, and also, on opposite sides of a lateral line extending through the center of the traction operating mechanism. The operating mechanism for the gathering arms 15, 15 and the conveyor 16 is also interchangeable from one side of the machine to the other side of the machine. Also, the gathering and conveying operating mechanism includes a substantial number of elements which are identical to elements found in the traction operating mechanism, for example, the gears and other elements of the gathering drive transmission 116, the brake disc 130 and the dual brake device 137, are like the gears and other elements of the traction transmissions 52, 52', the brake discs 67, 67' and the dual brake devices 72, 72', respectively. Similarly, most of the miter gears are identical, and within the traction operating mechanism the elements of the forward drive mechanism and the elements of the reverse drive mechanism are identical.

In the loading machine 10, which incorporates the instant invention, it is possible to drive the machine with just one of the motors 35, 35, by utilizing the conveyor foot shaft 22 as a power transmitting connection from one side to the other side of the loading machine 10. This is not intended for normal operation of the loading machine 10, but in the event of failure of one motor 35, the other motor 35 may be used to propel the loading machine 10 to a place where it can be repaired. The operating mechanisms of the invention comprise elements which are of simple form and are highly efficient in operation. The loading machine 10, incorporating such operating mechanisms, has an increased speed of operation and capacity, by reason of the more efficient operation thereof.

Obviously, those skilled in the art may make various changes in the details and arrangement of parts without departing from the spirit and scope of the invention as defined by the claims hereto appended, and applicants therefore wish not to be restricted to the precise construction herein disclosed.

Having thus described and shown an embodiment of the invention, what it is desired to secure by Letters Patent of the United States is:

1. In a mobile loading machine of the character described having traction means for forward and reverse propulsion of the machine and gathering means for collecting material into a conveying means in the machine, power means for operation of said traction means and said gathering means, a forward drive transmission for said traction means, a reverse drive transmission for said traction means, drive connections of said power means to said forward transmission and to said reverse transmission to continuously drive the forward and reverse transmissions, traction drive means for driving said traction means in either forward or reverse directions, a forward transmission engaging means to drivingly engage said forward transmission with said traction drive means to drive said traction means in the forward direction, a reverse transmission engaging means to drivingly engage said reverse transmission with said traction drive means to drive said traction means in the reverse direction, means for selectively operating either said forward transmission engaging means or said reverse transmission engaging means, a drive transmission for said gathering means, drive connections of said power means to said gathering transmission to continuously drive the gathering transmission, gathering drive means for driving said gathering means, a gathering transmission engaging means to drivingly engage said gathering transmission with said gathering drive means to drive said gathering means, and means for operating said gathering transmission engaging means.

2. In a mobile loading machine as recited in claim 1 including a housing to enclose said traction drive means, said forward transmission and said reverse transmission being disposed exteriorly of said housing, a housing to enclose said gathering drive means, and said gathering transmission being disposed exteriorly of said housing.

3. In a mobile loading machine as recited in claim 1 including a housing to enclose said traction drive means, said forward transmission and said reverse transmission being disposed exteriorly of said housing, said drive connections of said power means to said forward transmission and to said reverse transmission including drive elements extending through said traction drive means housing to the forward transmission and to the reverse transmission, respectively, drive elements extending from said forward transmission and from said reverse transmission to said traction drive means within said traction drive means housing, a housing to enclose said gathering drive means, said gathering transmission being disposed exteriorly of said housing, said drive connections of said power means to said gathering transmission including a drive element to the gathering transmission, and a drive element extending from said gathering transmission to said gathering drive means within said gathering drive means housing.

4. In a mobile loading machine as recited in claim 1 including a conveyor drive connection from said gathering drive means to said conveyor for driving the conveyor.

5. In a mobile loading machine as recited in claim 2 in which said forward transmission engaging means and said reverse transmission engaging means each comprises a brake disc disposed exteriorly of said traction drive means housing, and a brake for engagement with said brake disc to lock the brake disc, said gathering transmission engaging means comprises a brake disc disposed exteriorly of said gathering drive means housing, and a brake for engagement with said brake disc to lock the brake disc.

6. In a mobile loading machine of the character described having traction means for forward and reverse propulsion of the machine and gathering means for collecting material into a conveying means in the machine, power means for operation of said traction means and said gathering means, a forward drive gear transmission for said traction means, a reverse drive gear transmission for said traction means, gear drive connections of said power means to said forward transmission and to said reverse transmission to continuously drive the forward and reverse transmissions, traction drive gears for driving said traction means in either forward or reverse directions, a forward transmission engaging means to drivingly engage said forward transmission with said traction drive gears to drive said traction means in the forward direction, a reverse transmission engaging means to drivingly engage said reverse transmission with said traction drive gears to drive said traction means in the reverse direction, means for selectively operating either said forward transmission engaging means or said reverse transmission engaging means, a drive gear transmission for said gathering means, gear drive connections of said power means to said gathering transmission to continuously drive the gathering transmission, gathering drive gears for driving said gathering means, a gathering transmission engaging means to drivingly engage said gathering transmission with said gathering drive gears to drive said gathering means, and means for operating said gathering transmission engaging means.

7. In a mobile loading machine as recited in claim 6 including, gear drive connections from said gathering drive gears to said conveyor for driving the conveyor.

8. In a mobile loading machine of the character described having traction means for forward and reverse propulsion of the machine and gathering means for collecting material into a conveying means in the machine, power means for operation of said traction means and said gathering means, a forward drive planetary gear transmission for said traction means, a reverse drive planetary gear transmission for said traction means, each of said forward and reverse transmissions including a sun gear, a ring gear concentrically disposed with respect to said sun gear, at least one planet gear interposed between said sun gear and said ring gear, and a carrier for said planet gear, gear drive connections of said power means to said sun gear of the forward transmission and to said sun gear of the reverse transmission to continuously drive the respective sun gears, said planet gear of said forward transmission being in driving engagement with said sun gear and said ring gear of the forward transmission for continuously rotating the planet gear and the ring gear by said sun gear, said planet gear of said reverse transmission being in driving engagement with said sun gear and said ring gear of the reverse transmission for continuously rotating the plantet gear and the ring gear by said sun gear, traction drive gears for driving said traction means in either forward or reverse directions, means for locking said forward transmission ring gear to drivingly engage said forward transmission planet gear and its carrier with said traction drive gears to drive said traction means in the forward direction, means for locking said reverse transmission ring gear to drivingly engage said reverse transmission planet gear and its carrier with said traction drive gears to drive said traction means in the reverse direction, means for selectively operating either said forward transmission locking means or said reverse transmission locking means, a drive planetary gear transmission for said gathering means, said gathering transmission including a sun gear, a ring gear concentrically disposed with respect to said sun gear, at least one planet gear interposed between said sun gear and said ring gear, and a carrier for said planet gear, gear drive connections of said power means to said gathering transmission sun gear to continuously drive the sun gear, said planet gear of said gathering transmission being in driving engagement with said sun gear and said ring gear of the gathering transmission for continuously rotating the planet gear and the ring gear by said sun gear, gathering drive gears for driving said gathering means, means for locking said gathering transmission ring gear to drivingly engage said gathering transmission planet gear and its carrier with said gathering drive gears to drive said gathering means, and means for operating said gathering transmission locking means.

9. In a mobile loading machine as recited in claim 8 in which said means for locking said forward transmission ring gear comprises a brake disc connected to the ring gear to be rotatable with the ring gear, a brake for engagement with said forward transmission brake disc to lock the brake disc and said forward transmission ring gear, said means for locking said reverse transmission ring gear comprises a brake disc connected to the ring gear to be rotatable with the ring gear, a brake for engagement with said reverse transmission brake disc to lock the brake disc and said reverse transmission ring gear, said means for locking said gathering transmission ring gear comprises a brake disc connected to the ring gear to be rotatable with the ring gear, and a brake for engagement with said gathering transmission brake disc to lock the brake disc for said gathering transmission ring gear.

10. In a mobile loading machine as recited in claim 8 including a forward transmission housing, means supporting said forward transmission housing for rotation, said forward transmission ring gear being secured to said forward transmission housing, said forward transmission sun gear, planet gear and carrier being enclosed in said forward transmission housing, said forward transmission locking means including means to secure said forward transmission housing in fixed position, a reverse transmission housing, means supporting said reverse transmission housing for rotation, said reverse transmission ring gear being secured to said reverse transmission housing, said reverse transmission sun gear, planet gear and carrier being enclosed in said reverse transmission housing, said reverse transmission locking means including means to secure said reverse transmission housing in fixed position, a gathering transmission housing, means supporting said gathering transmission housing for rotation, said gathering transmission ring gear being secured to said gathring transmission housing, said gathering transmission sun gear, planet gear and carrier being enclosed in said gathering transmission housing, said gathering transmission locking means including means to secure said gathering transmission housing in fixed position.

11. In a mobile loading machine as recited in claim 8 including a forward transmission drive shaft from said gear drive connections to said forward transmission sun gear, a traction drive shaft from said forward transmission planet carrier to said traction drive gears, said forward transmission drive shaft and said forward traction drive shaft being disposed coaxially, a reverse transmission drive shaft from said gear drive connections to said reverse transmission sun gear, a traction drive shaft from said reverse transmission planet carrier to said traction drive gears, said reverse transmission drive shaft and said reverse traction drive shaft being disposed coaxially, a gathering transmission drive shaft from said gear drive connections to said gathering transmission sun gear, a gathering drive shaft from said gathering transmission planet carrier to said gathering drive gears, and said gathering transmission drive shaft and said gathering drive shaft being disposed coaxially.

12. In a mobile loading machine as recited in claim 11 in which said forward transmission drive shaft and said traction drive shaft are concentrically disposed one within the other, said reverse transmission drive shaft and said traction drive shaft are concentrically disposed one within the other, and said gathering transmission drive shaft and said gathering drive shaft are in line one with the other.

13. In a mobile loading machine of the character described having traction means for forward and reverse propulsion of the machine, and gathering means for collecting material into a conveying means in the machine, power means for operation of said traction means and said gathering means, a forward drive transmission for said traction means, a reverse drive transmission for said traction means, drive connections of said power means to said forward transmission and to said reverse transmission to continuously drive the forward and reverse transmissions, said drive connections including a drive shaft extending laterally to said forward transmission and a drive shaft extending laterally to said reverse transmission, traction drive means for driving said traction means in either forward or reverse directions, a forward traction drive shaft extending laterally from said forward transmission to said traction drive means, a reverse traction drive shaft extending laterally from said reverse transmission to said traction drive means, a forward transmission engaging means to drivingly engage said forward transmission with said traction drive means through said forward traction drive shaft to drive said traction means in the forward direction, a reverse transmission engaging means to drivingly engage said reverse transmission with said traction drive means through said reverse traction drive shaft to drive said traction means in the reverse direction, means for selectively operating either said forward transmission engaging means or said reverse transmission engaging means, a drive transmission for said gathering means, drive connections of said power means to said gathering transmission to continuously drive the gathering transmission, said gathering drive connections including a drive shaft extending longitudinally to said gathering transmission, gathering drive means for driving said gathering means, a gathering means drive shaft from said gathering transmission to said gathering drive means, a gathering transmission engaging means to drivingly engage said gathering transmission with said gathering drive means through said gathering means drive shaft to drive said gathering means, and means for operating said gathering transmission engaging means.

14. In a mobile loading machine of the character described having traction means for forward and reverse propulsion of the machine and gathering means for collecting material into a conveying means in the machine, power means for operation of said traction means and said gathering means, a forward drive planetary gear transmission for said traction means, a reverse drive planetary gear transmission for said traction means, each of said forward and reverse transmissions including a sun gear, a ring gear concentrically disposed with respect to said sun gear, at least one planet gear interposed between said sun gear and said ring gear, and a carrier for said planet gear, drive connections of said power means to said forward transmission and to said reverse transmission to continuously drive said forward and reverse transmissions including a forward transmission drive shaft to said forward transmission sun gear and a reverse transmission drive shaft to said reverse transmission sun gear, said planet gear of said forward transmission being in driving engagement with said sun gear and said ring gear of the forward transmission, said planet gear of said reverse transmission being in driving engagement with said sun gear and said ring gear of the reverse transmission, intermediate forward drive gears for driving said traction means in the forward direction, intermediate reverse drive gears for driving said traction means in the reverse direction, a forward traction drive shaft from said forward transmission planet gear carrier to said intermediate forward drive gears, a reverse traction drive shaft from said reverse transmission planet gear carrier to said intermediate reverse drive gears, final drive gears engaged with said intermediate forward drive gears and with said intermediate reverse drive gears and connected to said traction means for driving said traction means in either forward or reverse directions, means for locking said forward transmission ring gear to drivingly engage said forward transmission planet gear and its carrier and said forward traction drive shaft with said intermediate forward drive gears to drive said final drive gears and traction means in the forward direction, means for locking said reverse transmission ring gear to drivingly engage said reverse transmission planet gear and its carrier and said reverse traction drive shaft with said intermediate reverse drive gears to drive said final drive gears and traction means in the reverse direction, means for selectively operating either said forward transmission locking means or said reverse transmission locking means, a drive planetary gear transmission for said gathering means, said gathering transmission including a sun gear, a ring gear concentrically disposed with respect to said sun gear, at least one planet gear interposed between said sun gear and said ring gear, and a carrier for said planet gear, drive connections of said power means to said gathering transmission to continuously drive said gathering transmission, a gathering transmission drive shaft from said drive connections to said gathering transmission sun gear, said planet gear of said gathering transmission being in driving engagement with said sun gear and said ring gear of the gathering transmission, gathering drive gears for driving said gathering means, a gathering means drive shaft from said gathering transmission planet gear carrier to said gathering drive gears, means for locking said gathering transmission ring gear to drivingly engage said gathering transmission planet gear and its carrier and said gathering means drive shaft to said gathering drive gears to drive said gathering means, and means for operating said gathering transmission locking means.

15. In a mobile loading machine of the character described having traction means for forward and reverse propulsion of the machine and gathering means for collecting material into a conveying means in the machine, power means for operation of said traction means and said gathering means, a forward drive planetary gear transmission for said traction means, a reverse drive planetary gear transmission for said traction means, each of said forward and reverse transmissions including a sun gear, a ring gear concentrically disposed with respect to said sun gear, at least one planet gear interposed between said sun gear and said ring gear, and a carrier for said planet gear, drive connections of said power means to said forward transmission and to said reverse transmission to continuously drive said forward and reverse transmissions including a longitudinally extending drive shaft from the power means, a forward transmission drive shaft from said longitudinally extending drive shaft to said forward transmission sun gear, a reverse transmission drive shaft from said longitudinally extending drive shaft to said reverse transmission sun gear, each of said forward transmission drive shaft and said reverse transmission drive shaft extending laterally and miter gears connecting said longitudinally extending drive shaft to said forward transmission drive shaft and to said reverse transmission drive shaft, said planet gear of said forward transmission being in driving engagement with said sun gear and said ring gear of the forward transmission, said planet gear of said reverse transmission being in driving engagement with said sun gear and said ring gear of the reverse transmission, intermediate forward drive spur gears for driving said traction means in the forward direction, intermediate reverse drive spur gears for driving said traction means in the reverse direction, a forward traction drive shaft extending laterally from said forward transmission planet gear carrier to said intermediate forward drive spur gears, a reverse traction drive shaft extending laterally from said reverse transmission planet gear carrier to said intermediate reverse drive spur gears, final drive spur gears disposed between and engaged with said intermediate forward drive spur gears and said intermediate reverse drive spur gears and connected to said traction means for driving said traction means in either forward or reverse directions, means for locking said forward transmission ring gear to drivingly engage said forward transmission planet gear and its carrier and said forward traction drive shaft with said intermediate forward drive gears to drive said final drive gears and traction means in the forward direction, means for locking said reverse transmission ring gear to drivingly engage said reverse transmission planet gear and its carrier and said reverse traction drive shaft with said intermediate reverse drive gears to drive said final drive gears and traction means in the reverse direction, means for selectively operating either said forward transmission locking means or said reverse transmission locking means, a drive planetary gear transmission for said gathering means, said gathering transmission including a sun gear, a ring gear concentrically disposed with respect to said sun gear, at least one planet gear interposed between said sun gear and said ring gear, and a carrier for said planet gear, drive connections of said power means to said gathering transmission to continuously drive said gathering transmission including a laterally extending drive shaft connected to said longitudinally extending drive shaft by miter gears, a gathering transmission drive shaft from said laterally extending drive shaft to said gathering transmission sun gear, said gathering transmission drive shaft extending longitudinally and miter gears connecting said laterally extending drive shaft to said gathering transmission drive shaft, said planet gear of said gathering transmission being in driving engagement with said sun gear and said ring gear of the gathering transmission, gathering drive spur and bevel gears for driving said gathering means, a gathering means drive shaft extending longitudinally from said gathering transmission planet gear carrier to said gathering drive spur and bevel gears, means for locking said gathering transmission ring gear to drivingly engage said gathering transmission planet gear and its carrier and said gathering means drive shaft to said gathering drive spur and bevel gears to drive said gathering means, and means for operating said gathering transmission locking means.

16. In a mobile loading machine as recited in claim 15 including bevel gear means engaged with said gathering means drive bevel gears and connected to said conveying means to drive the conveying means.

17. In a mobile machine of the character described comprising a main frame for supporting the mechanisms of the machine, traction means for forward and reverse propulsion of the machine, power means on the main frame for operation of said traction means, a forward drive transmission for said traction means, a reverse drive transmission for said traction means, each of said forward transmission and said reverse transmission comprising a planetary gear transmission having a sun gear, a ring gear, and at least one planet gear intermediate said sun gear and said ring gear, a housing for said planetary gear transmission, said ring gear being secured to said housing, means supporting said housing for rotation, drive connections of said power means to said forward transmission and to said reverse transmission to continuously drive the forward and reverse transmissions, traction drive means on said main frame for driving said traction means in either forward or reverse directions, a forward transmission engaging means to drivingly engage said forward transmission with said traction drive means to drive said traction means in the forward direction, a reverse transmisson engaging means to drivingly engage said reverse transmission with said traction drive means to drive said traction means in the reverse direction, and means for selectively opertaing either said forward transmission engaging means or said reverse transmission engaging means.

18. In a mobile machine as recited in claim 17 in which said forward transmission engaging means and said reverse transmission engaging means each includes a brake disc secured to said transmission housing, and means engageable with said brake disc to lock the brake disc and to stop rotation of said transmission housing and said planetary ring gear.

19. In a mobile machine of the character described comprising a main frame for supporting the mechanisms of the machine, traction means for forward and reverse propulsion of the machine, power means on the main frame for operation of said traction means, a forward drive planetary gear transmission for said traction means including a sun gear, a ring gear, and at least one planet gear intermediate said sun gear and said ring gear, a reverse drive planetary gear transmission for said traction means including a sun gear, a ring gear, and at least one planet gear intermediate said sun gear and said ring gear, drive connections of said power means to said forward transmission to continuously drive the forward transmission including a forward transmission drive shaft connected to said forward transmission, drive connections of said power means to said reverse transmission to continuously drive the reverse transmission including a reverse transmission drive shaft connected to said reverse transmission, traction drive means on said main frame for driving said traction means in either forward or reverse directions including traction final drive gears, forward traction intermediate drive gears, reverse traction intermediate drive gears, a forward traction drive shaft from said forward transmission to said forward traction intermediate drive gears, a reverse traction drive shaft from said reverse transmission to said reverse traction intermediate drive gears, said forward traction intermediate drive gears and said reverse traction intermediate drive gears each being drivingly connected to said traction final drive gears, a forward transmission engaging means to drivingly engage said forward transmission with said traction drive means to drive said traction means in the forward direction, a reverse transmission engaging means to drivingly engage said reverse transmission with said traction drive means to drive said traction means in the reverse direction, and means for selectively operating either said forward transmission engaging means or said reverse transmission engaging means.

20. In a mobile machine as recited in claim 19 in which said forward transmission drive shaft is connected to a gear of said forward transmission, said forward traction drive shaft is connected to a gear of said forward traction intermediate drive gears, said forward transmission drive shaft and said forward traction drive shaft being concentrically disposed one within the other, said reverse transmission drive shaft is connected to a gear of said reverse transmission, said reverse traction drive shaft is connected to a gear of said reverse traction intermediate drive gears, and said reverse transmission drive shaft and said reverse traction drive shaft being concentrically disposed one within the other.

References Cited by the Examiner
UNITED STATES PATENTS

| | | | |
|---|---|---|---|
| 932,814 | 8/1909 | Saussard | 74—785 X |
| 1,356,718 | 10/1920 | Hoct | 74—785 X |
| 1,804,668 | 5/1931 | Bolgiano | 180—6.66 |
| 2,149,320 | 3/1939 | Szekely | 74—785 X |
| 2,170,610 | 8/1939 | Schutz | 74—785 X |
| 2,360,282 | 10/1944 | Russell | 198—10 |
| 2,585,790 | 2/1952 | Kelley | 180—6.7 |
| 2,757,746 | 8/1956 | Biedess | 180—6.7 |
| 2,793,732 | 5/1957 | Russell | 198—10 |
| 2,870,655 | 1/1959 | Rockwell | 74—785 |

EVON C. BLUNK, *Primary Examiner.*

EDWARD A. SROKA, *Examiner.*